April 19, 1927.

E. B. LOCKE 1,625,126

COUNTING SCALE

Filed March 25, 1922      5 Sheets-Sheet 1

Inventor
EDWARD B. LOCKE.

By [signature]

Attorney

April 19, 1927.

E. B. LOCKE

COUNTING SCALE

Filed March 25, 1922 5 Sheets-Sheet 2

1,625,126

Inventor
EDWARD B. LOCKE.

By Edward Reed

Attorney

Fig-7

Patented Apr. 19, 1927.

1,625,126

UNITED STATES PATENT OFFICE.

EDWARD B. LOCKE, OF DAYTON, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COUNTING SCALE.

Application filed March 25, 1922. Serial No. 546,657.

This invention relates to a scale and more particularly to a scale having means for computing the number of articles in a bulk or mass, and is in the nature of an improvement on the device shown and described in the application for patent filed by me February 28, 1922, Serial No. 539,877.

The apparatus of said application comprises a counting device and a weighing mechanism which is adjustable relatively to the counting device in order to accommodate it to articles or units of different weights, the adjustment being accomplished by hand.

One object of the present invention is to provide a counting scale in which the adjustment of the weighing mechanism to vary its influence upon the counting device will be automatically controlled, thereby insuring an accurate adjustment of the weighing mechanism.

A further object of the invention is to provide such a device in which the automatic adjustment of the weighing mechanism will be controlled by the weight of a unit carried by a suitable support.

A further object of the invention is to provide such a device which will be very simple in its construction and accurate in its operation.

Other objects of the invention will appear as the device is described in detail.

In the accompanying drawings

Figure 1:
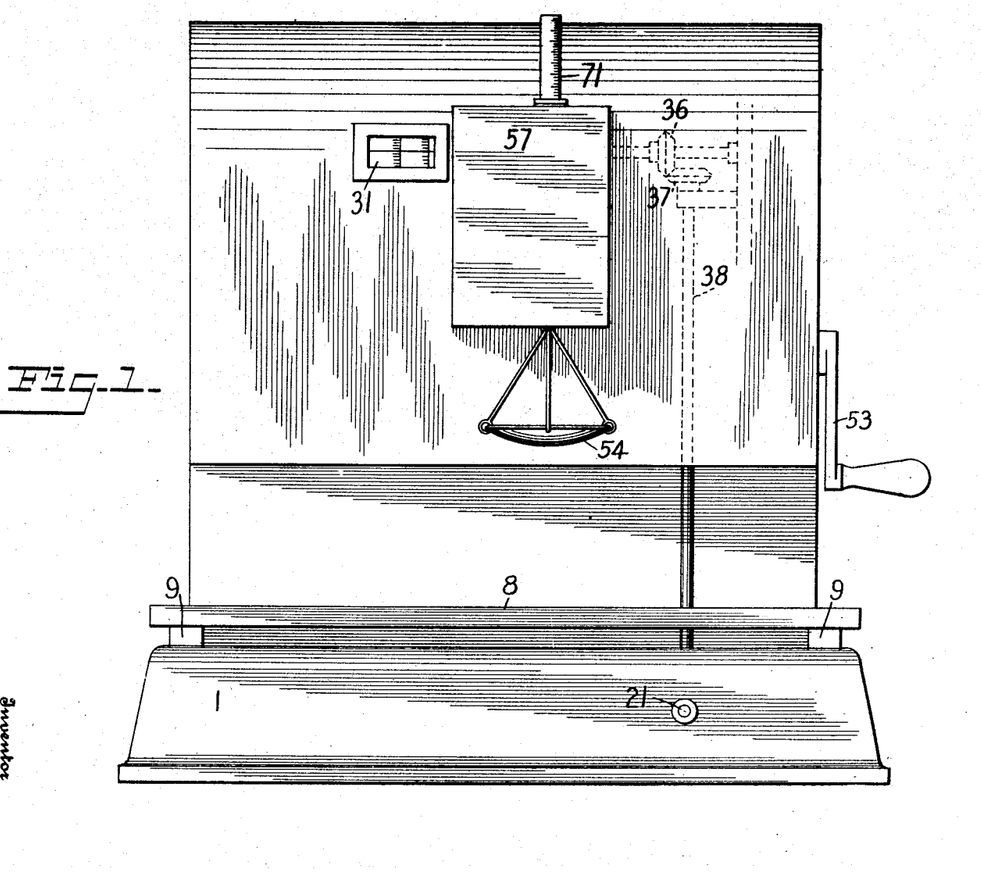
Fig. 1 is a front elevation of a mechanism embodying my invention.
Figures 2, 3:
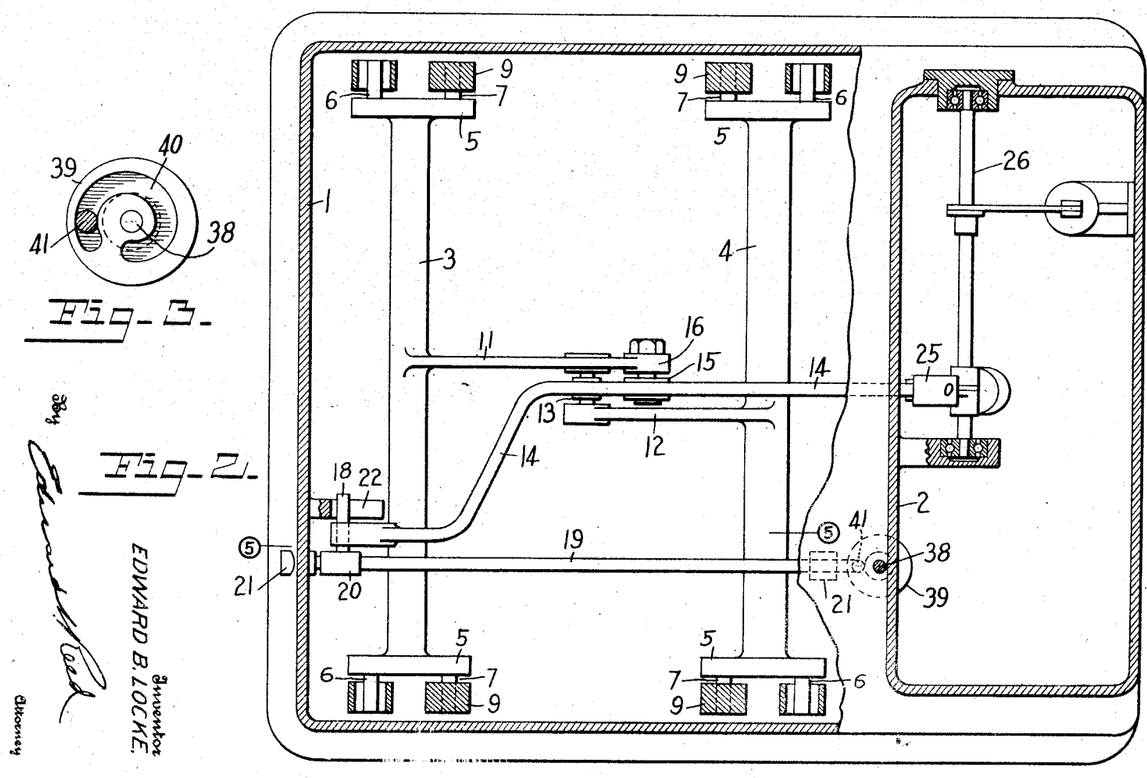
Fig. 2 is a plan view, partly broken away, showing the mechanism within the base.
Fig. 3 is a detail of the adjusting cam.
Figures 4, 5:
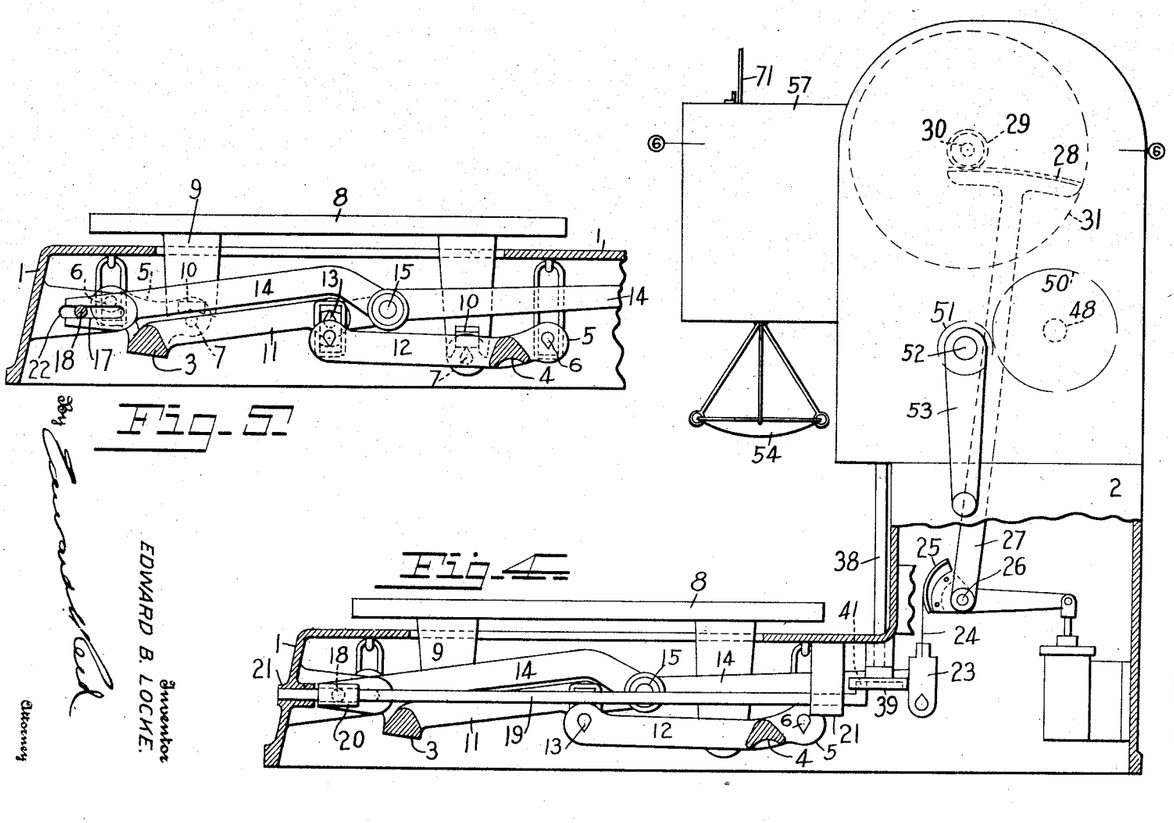
Fig. 4 is a side elevation of the mechanism, partly in section.
Fig. 5 is a section taken on the line 5—5 of Fig. 2.

In these drawings I have illustrated one embodiment of my invention and have shown the same as applied to a weighing mechanism and counting device similar to that shown and described in the above mentioned application. It will be understood, however, that the invention is not limited to this particular type of weighing mechanism or counting mechanism, but that it may take various forms without departing from the spirit of the invention, as I believe myself to be the first to have provided means for automatically controlling the adjustment of a weighing mechanism relatively to a counting device. In that form of the device here shown the mechanism is mounted in a casing which constitutes a supporting frame for the several parts of the mechanism and which comprises a base 1 and a housing 2 extending upwardly from the rear portion of said base. Mounted within the base 1 are parallel rock shafts, or bars, 3 and 4, each having at each end thereof a cross head 5 and each cross head having near the outer end thereof a pivot pin 6 and having near the inner end thereof a pivot pin 7. The pivot pins 6 engage suitable bearings carried by the base 1 and which form the support for the weighing mechanism. The pivot pins 7 support the weighing platform 8 which, in the present instance, is provided with standards 9 having at their lower ends bearings 10 to engage the respective pivots 7. Each of the rock shafts 3 and 4 has secured thereto an inwardly extending arm, 11 and 12, respectively, the adjacent ends of which overlap and are pivotally connected one to the other, as shown at 13, in such a manner as to permit the connected ends of the two arms to rise and fall when the shafts 3 and 4 move about the pivotal supports.

The counting mechanism may take any suitable form and may be connected with the weighing mechanism in any suitable manner, but as here shown the weighing mechanism comprises a lever 14 pivotally mounted thereon between its ends, and in the present instance mounted at 15 on the rear end 16 of the rock arm 11 which extends rearwardly beyond its point of connection with the arm 12. The lever is preferably fulcrumed near the forward end of the base 1 upon a normally stationary, but adjustable, fulcrum, the adjustment of which will cause different amounts of movement to be imparted to the lever 14 by a given weight placed upon the platform 8. As here shown, the lever 14 is provided at its rear end with a longitudinally extending slot 17 which embraces and is supported by a pin 18 which constitutes the fulcrum about which the lever moves and which may be adjusted lengthwise of the slot 17, toward and from the point of connection of the lever with the weighing mechanism. The fulcrum pin 18 is mounted on a rod 19 and is adapted to be adjusted with relation to the lever 14 by the movement of that rod. In the present instance the pin is carried by a sleeve 20 which in turn is mounted on the rod, the rod being mounted in bearings 21 in the base. If desired, this sleeve may be screw threaded on to the rod 19 and the fulcrum adjusted by the rotation of that rod, as shown in the above mentioned application, but in the present instance I have rigidly secured the sleeve 20 to the rod 19 and have slidably mounted the rod in its bearings 21. Preferably means are provided for supporting the outer end of the fulcrum pin 18 and holding the same against any tendency to turn about the axis of the rod 19. As here shown, the outer end of the fulcrum pin is mounted in a slotted bracket 22 which permits it to move lengthwise of the lever 14 but holds it against turning movement about the axis of the rod 19.

The rear end of the lever 14 is connected with the counting mechanism, which preferably comprises a suitable indicator which indicates the count. As here shown, the rear end of the lever is pivotally connected with the yoke 23 which in turn is connected by a flexible strap 24 with a segment 25 rigidly secured to a shaft 26. Mounted on the shaft 26 is an upwardly extending arm 27 having at its upper end a toothed segment 28 which meshes with a pinion 29 on a shaft 30 which carries an indicator drum 31. Thus it will be apparent that a weight placed upon the platform 8 will impart movement to the lever 14 and through this lever to the indicator 31 of the counting device, the amount of movement imparted to the indicator by any given weight depending upon the adjustment of the fulcrum 18.

In the present instance, the indicator drum is provided with two series of indications, one, as shown at A, being graduated in ounces and adapted to indicate the weight of the article or mass of articles on the platform 8 when the weighing mechanism has been adjusted to a certain predetermined position, which may, if desired, be one of the extremities of its adjustment. The graduations of the second series of graduations, B, are spaced equal distances apart and when the weighing mechanism has been so adjusted with relation to the counting mechanism that a single article or unit to be counted will move the indicator a distance equal to the space between two of the indications of the series B, it will be apparent that a plurality of articles will move the indicator a distance sufficient to bring into indicating position that indication corresponding to the number of articles on the scale, it being understood, of course, that all the articles are of the same weight. The indications of the series B being spaced fixed distances apart it will be apparent that in order that this scale or series of indications may be utilized to count articles of different weights, the weighing mechanism must be adjusted to cause a single article to move the drum through the space of one indication. To facilitate this adjustment and to insure its accuracy I prefer to provide automatically controlled means for accomplishing the same and in the present instance I have provided a unit weighing mechanism, adapted to support a single article, or unit, which controls the amount of movement imparted to the adjusting device.

The adjusting device may take various forms and may be actuated in various ways but, as here shown, it comprises a rack 32 mounted for vertical movement in bearings 33 in the housing 2. This rack meshes with a pinion 34 on a shaft 35 which is connected by means of beveled gears 36 and 37 with a shaft 38 which extends downwardly into the base 1 and is operatively connected at its lower end with the adjusting rod 19 for the fulcrum pin 18. If the adjustment is accomplished by the rotation of the rod 19, as shown in the above mentioned application, a geared connection may be imposed between the shaft and the rod, but where, as in the present instance, a sliding connection is utilized I prefer to employ a cam for actuating the rod 19. As here shown, a snail cam 39 is rigidly secured to the lower end of the shaft 38 and has a cam groove 40 to receive a pin 41 on the end of the rod 19 so that a given amount of rotation imparted to the shaft 38 will impart a given movement to the fulcrum pin.

Figure 6:
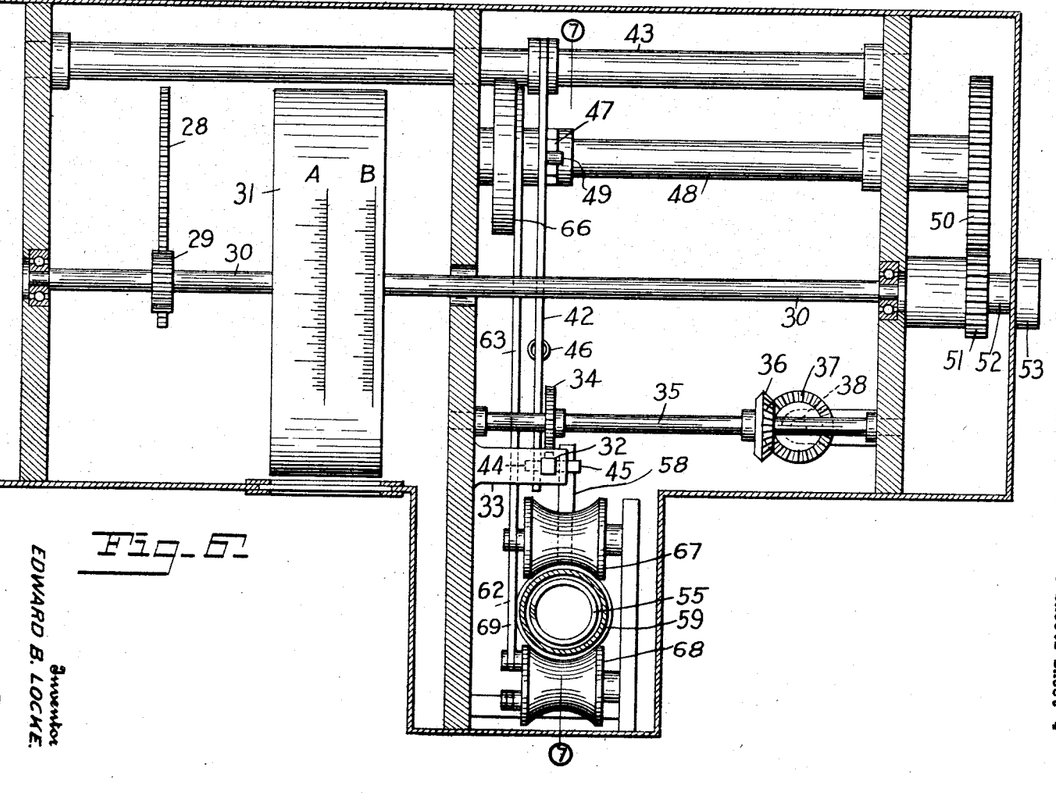
Fig. 6 is a section taken on the line 6—6 of Fig. 4.

Movement may be imparted to the rack 32 in various ways, but as here shown, a rock arm 42 which is mounted on a shaft 43 has its free end arranged beneath a pin 44 carried by the rack 32 and is acted upon by a spring 46 which tends to move the same downwardly and thus impart movement to the rack 32. The rock arm is held normally against movement by a cam, or locking arm, 47 which is secured to a shaft 48 and is so arranged that when in its normal, or uppermost position it will lie in the path of a pin 49 secured to the arm 42. When the arm is rotated the rocking arm or cam 47 will be moved out of the path of the pin and the arm will be moved downward by the spring 46, thus imparting movement to the rack and to the shaft 38. The shaft 48 may be rotated in any suitable manner, but, as here shown, it has secured thereto a gear 50 which meshes with a pinion 51 on a stud 52 with which is connected a crank, or operating handle, 53.

Figure 7:
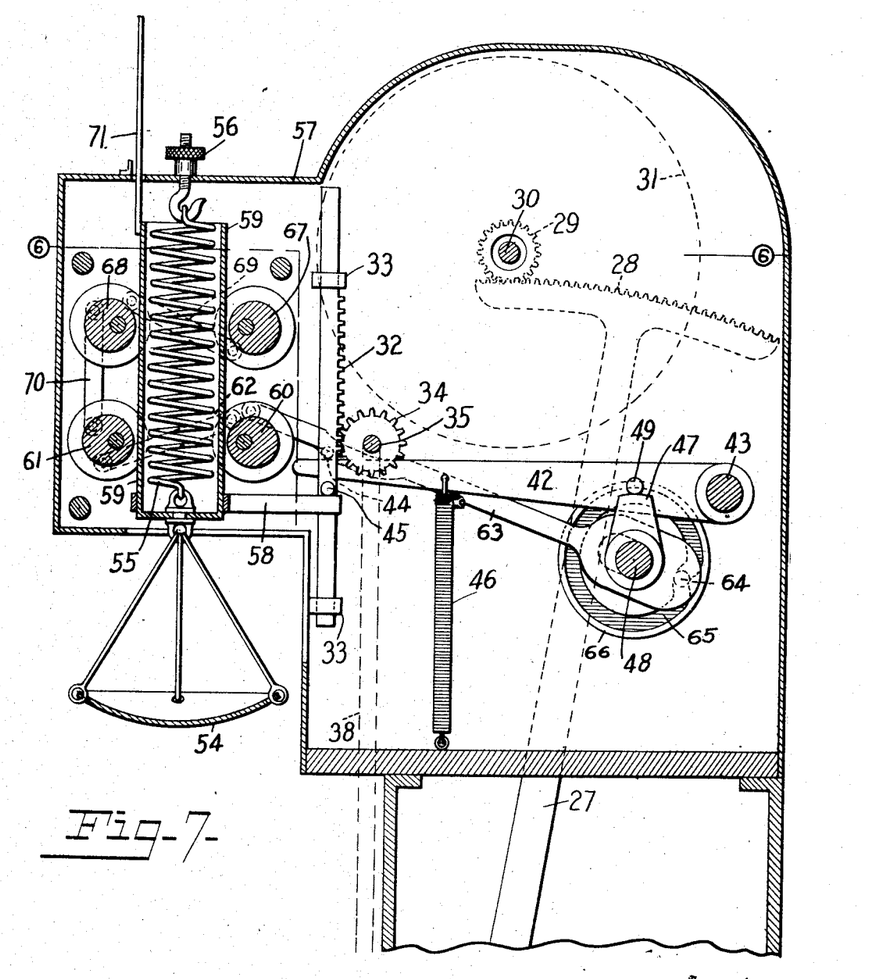
Fig. 7 is a section taken on the line 7—7 of Fig. 6.

The amount of movement imparted to the rack 32 and, consequently, to the fulcrum pin is determined by the weight of the article, a plurality of which are to be counted, and, in the present instance, I employ a unit receptacle which actuates a stop, which in turn controls the amount of movement imparted to the rack 32. As here shown, the unit receptacle 54 is connected with the lower end of a spring 55 which is supported from a hook 56 mounted in the upper wall of a forwardly extending portion 57 of the housing 2. A stop, such as a laterally extending bar 58, is connected with the unit receptacle and extends into the path of a stop on the rack bar 32, the lower pin 45 being utilized for this purpose in the present device. When an article is placed in the unit receptacle the stop 58 will be moved downward a distance corresponding to the weight of that article and in order that the stop may interrupt the movement of the rack bar and thus control the adjustment of the fulcrum pin, the stop must be locked against movement. In the present construction I have shown the bar as rigidly secured to a tubular housing 59 which includes the spring 55 and is connected with the unit receptacle for movement therewith. After the article has been placed in the units receptacle the latter is locked against movement by means of locking devices which grip the member which carries the stop 58 and which in the present instance is the tubular housing 59. As here shown, the locking members are in the form of eccentrically mounted circular members 60 and 61 which are preferably provided with peripheral grooves to enable them to embrace the adjacent portions of the housing. These locking members are connected one to the other for movement in unison by means of a link 62 and locking movement is imparted to the two locking members by means of a pitman 63 pivotally connected with the locking member 60 and slidably mounted at its other end upon the shaft 48. Secured to the pitman 63 is a pin 64 which extends into the slot 65 of a cam disk 66 rigidly secured to the shaft 48. The cam slot is of such a shape and so arranged that when the shaft 48 is in its normal, or idle, position and the locking arm or cam 47 is in the path of the pin 49, the pitman will be held in such a position that the locking members will be inoperative, but the first movement of the shaft 48 will impart operative movement to the pitman and thus cause the locking members to grip the tubular housing and positively lock the unit weighing mechanism against movement, this locking operation taking place before the locking arm, or cam, 47 is moved out of the path of the pin 49, thereby causing the unit receptacle and stop 58 to be positively locked against movement before the rack 32 is operated. To prevent any tendency of the housing 59 to tilt when the stop 58 is engaged by the pin on the rack bar, I prefer to provide a duplicate set of locking members arranged to act on the housing 59 one above the other and, as here shown, a second pair of circular locking members, 67 and 68, are arranged above the first pair of locking members and are connected one to the other by a link 69 and the locking member 68 is connected with the locking member 61 of the first pair by a link 70, the connections being so arranged that both pairs of locking members will be caused to simultaneously grip the housing 59. If desired the housing 59, or other stop supporting member may be provided with an indicator, such as a bar 71 which projects above the housing 57 and indicates the position of the fulcrum.

The operation of the mechanism will be readily understood from the foregoing description of the several parts thereof and it will be apparent that when it is desired to count a plurality of similar articles one of these articles is first placed on the unit receptacle and the shaft 48 then operated to lock the unit receptacle and its cooperating stop 58 against movement and to then release the actuating arm 42 which moves the rack 32 downwardly into engagement with the stop 58 and thereby adjusts the fulcrum pin according to the weight of the article in the unit receptacle. If then a mass of similar articles be placed upon the scale platform 8 the movement thereby imparted to the counting lever 14 will cause the indicator drum to be moved a distance corresponding accurately to the number of articles on the platform and to expose at the sight opening in the housing an indication of the number of articles on the scale.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. The combination with weighing mechanism, a counting device operatively connected with said weighing mechanism, and means for adjusting said weighing mechanism to vary its influence on said counting device, of weight operated means to control the adjustment of said weighing mechanism according to the unit weight of the articles to be counted.

2. The combination with weighing mechanism, and a counting device operatively connected with said weighing mechanism, said weighing mechanism being adjustable to vary its influence on said counting device, of a unit supporting device, and means controlled by said unit supporting device to adjust said weighing mechanism.

3. The combination with weighing mechanism, and a counting device operatively connected with said weighing mechanism, said weighing mechanism being adjustable to vary its influence on said counting device, and of means comprising a yieldable member to automatically control the adjustment of said weighing mechanism.

4. The combination with weighing mechanism comprising a lever having an adjustable fulcrum, of a counting device operatively connected with said weighing mechanism, means for adjusting said fulcrum, and a device for controlling the operation of said adjusting means.

5. The combination with weighing mechanism, comprising a lever having an adjustable fulcrum, of a counting device operatively connected with said weighing mechanism, means for adjusting said fulcrum, and means controlled by the weight of a unit for controlling said adjustment.

6. The combination with weighing mechanism, comprising a lever having an adjustable fulcrum, of a counting device operatively connected with said weighing mechanism, a unit receptacle, supporting means for said unit receptacle which will permit the latter to assume a position corresponding to the weight of a unit therein, and means controlled by the position of said unit receptacle to adjust said fulcrum.

7. The combination with weighing mechanism, a counting device operatively connected with said weighing mechanism, and means for adjusting said weighing mechanism to vary its influence on said counting device, of an actuating device for adjusting said weighing mechanism, a unit receptacle, supporting means for said unit receptacle which will permit the latter to assume a position corresponding to the weight of a unit therein, and means controlled by the position of said unit receptacle to determine the movement of said actuating device.

8. The combination with weighing mechanism, and a counting device operatively connected with said weighing mechanism, said weighing mechanism being adjustable to vary its influence on said counting device, of an actuating device for adjusting said weighing mechanism, a unit receptacle, a stop to limit the movement of said actuating device, and an operative connection between said stop and said unit receptacle.

9. The combination with weighing mechanism, and a counting device operatively connected with said weighing mechanism, said weighing mechanism being adjustable to vary its influence on said counting device, of an actuating device for adjusting said weighing mechanism, a unit receptacle, a stop to limit the movement of said actuating device, an operative connection between said stop and said unit receptacle, and means to secure said stop against movement during the operation of said actuating device.

10. The combination with weighing mechanism, and a counting device operatively connected with said weighing mechanism, said weighing mechanism being adjustable to vary its influence on said counting device, of actuating device for adjusting said weighing mechanism, of means to normally hold said actuating device in an inoperative position, a unit receptacle, a stop operatively connected with said unit receptacle and arranged to control the movement of said actuating device, a lock to hold said stop against movement, and means for first actuating said lock and then releasing said actuating device.

11. The combination with a counting device, and weighing mechanism operatively connected with said counting device and adjustable to vary its influence thereon, of a spring actuated device for adjusting said weighing mechanism with relation to said counting device, a stop to limit the movement of said actuating device under the influence of its spring, a unit receptacle to control the position of said stop, and means to lock said stop against movement.

12. The combination with a counting device and weighing mechanism operatively connected with said counting device and adjustable to vary its influence thereon, of an actuating device for adjusting said weighing mechanism relatively to said counting device, a spring actuated arm for imparting movement to said actuating device, an adjustable stop for controlling the movement of said actuating device, a unit receptacle operatively connected with said stop, and means to lock said stop in its adjusted position during the operation of said actuating device.

13. The combination with a counting device and weighing mechanism operatively connected with said counting device and adjustable to vary its influence thereon, of an actuating device for adjusting said weighing mechanism relatively to said counting device, a stop to control the movement of said actuating device, a unit receptacle, a supporting member connected with said unit receptacle to carry said stop, and means acting on said supporting member to hold said stop against movement.

14. The combination with a counting device and weighing mechanism operatively connected with said counting device and adjustable to vary its influence thereon, of an actuating device for adjusting said weighing mechanism relatively to said counting device, a spring to operate said actuating device, means to normally hold said actuating device in its inoperative position, a stop to limit the movement of said actuating device under the influence of said spring, a supporting member for said stop, a unit receptacle operatively connected with said supporting member, locking means cooperating with said supporting member to hold said stop against movement, and means for moving said locking means into operative engagement with said supporting member before said actuating device is released for operation.

15. The combination with a counting device and weighing mechanism operatively connected with said counting device and adjustable to vary its influence thereon, of an adjusting device for said weighing mechanism comprising a cam, automatically operated means for imparting movement to said cam, a unit receptacle, and means controlled by said unit receptacle to limit the movement of said cam.

16. The combination with a counting device, and weighing mechanism operatively connected with said counting device and adjustable to vary its influence thereon, of an adjusting device for said weighing mechanism comprising a cam, a shaft operatively connected with said cam, a pinion connected with said shaft, a toothed rack meshing with said pinion, a spring to impart movement to said rack, means to normally hold said rack against movement, a unit receptacle, and means controlled by said unit receptacle to limit the movement of said rack under the influence of said spring.

17. The combination with a counting device and weighing mechanism operatively connected with said counting device and adjustable to vary its influence thereon, of an adjusting device for said weighing mechanism comprising a cam, a shaft operatively connected with said cam, a pinion connected with said shaft, a toothed rack meshing with said pinion, a spring to impart movement to said rack, means to normally hold said rack against movement, a stop to limit the movement of said rack, a unit receptacle, and an operative connection between said unit receptacle and said stop, whereby the position of the latter will be controlled by said unit receptacle.

18. The combination with a counting device and weighing mechanism operatively connected with said counting device and adjustable to vary its influence thereon, of an adjusting device for said weighing mechanism comprising a cam, a shaft operatively connected with said cam, a pinion connected with said shaft, a toothed rack meshing with said pinion, a spring to impart movement to said rack, means to normally hold said rack against movement, a stop to limit the movement of said rack, a unit receptacle, an operative connection between said unit receptacle and said stop, whereby the position of the latter will be controlled by said unit receptacle, and means for holding said stop against movement during the operative movement of said rack.

19. The combination with a counting device and weighing mechanism operatively connected with said counting device and adjustable to vary its influence thereon, of an adjusting device for said weighing mechanism comprising a cam, a shaft operatively connected with said cam, a pinion connected with said shaft, a rack meshing with said pinion, spring actuated means to operate said rack, a stop to limit the movement of said rack, a unit receptacle operatively connected with said stop to control the position thereof, a controlling shaft, means for rotating said controlling shaft, and devices carried by said controlling shaft to hold said rack normally in an inoperative position and to lock said stop against movement before said rack is released for operation.

20. The combination with a counting device, weighing mechanism comprising a lever operatively connected with said counting device, and an adjustable fulcrum for said lever, of an adjusting device connected with said fulcrum, means for actuating said adjusting device, a unit receptacle, and means controlled by said unit receptacle to control the movement imparted to said adjusting device.

21. The combination with a counting device, weighing mechanism comprising a lever operatively connected with said counting device, and an adjustable fulcrum for said lever, of an actuating rod operatively connected with said fulcrum, spring actuated means for imparting movement to said actuating rod, a unit receptacle, means controlled by said unit receptacle to control the movement imparted to said actuating rod.

22. The combination with a counting device, weighing mechanism comprising a lever operatively connected with said counting device, and an adjustable fulcrum for said lever, of an actuating rod operatively connected with said fulcrum, a shaft operatively connected with said actuating rod, means for rotating said shaft, and means to automatically control the amount of movement imparted to said shaft.

23. The combination with a counting device, weighing mechanism comprising a lever operatively connected with said counting device, and an adjustable fulcrum for said lever, of an actuating rod operatively connected with said fulcrum, a shaft operatively connected with said actuating rod, means for rotating said shaft, a unit supporting device, and means controlled by said unit supporting device to control the amount of rotation imparted to said shaft.

24. The combination with a counting device, weighing mechanism comprising a lever operatively connected with said counting device, and an adjustable fulcrum for said lever, of an actuating rod operatively connected with said fulcrum, a shaft, an operative connection between said shaft and said actuating rod comprising a cam, spring actuating means for imparting rotatory movement to said shaft, a unit receptacle to control the amount of rotatory movement imparted to said shaft.

25. The combination with a counting device, weighing mechanism comprising a lever operatively connected with said counting device, and an adjustable fulcrum for said lever, of an actuating rod operatively connected with said fulcrum, a shaft operatively connected with said actuating rod, an actuating member, a rack and pinion connection between said actuating member and said shaft, means to hold said actuating member normally against movement, a stop to limit the movement of said actuating member, a unit receptacle to control the position of said stop, and means to lock said stop against movement during the operation of said actuating member.

26. The combination with a counting device, weighing mechanism comprising a lever operatively connected with said counting device, and an adjustable fulcrum for said lever, of an actuating rod operatively connected with said fulcrum, a shaft operatively connected with said actuating rod, an actuating member, a rack and pinion connection between said actuating member and said shaft, means to hold said actuating member normally against movement, a stop to limit the movement of said actuating member, a unit receptacle to control the position of said stop, means to lock said stop against movement during the operation of said actuating member, and a single operating device to first actuate said locking means and to then release said actuating member for operation.

27. The combination with a counting device, weighing mechanism comprising a lever operatively connected with said counting device, and an adjustable fulcrum for said lever, of an actuating rod operatively connected with said fulcrum, a shaft, a cam actuated by said shaft and arranged in operative relation with said actuating rod, a pinion connected with said shaft, a rack meshing with said pinion, spring operated means for imparting movement to said rack, a stop to limit the movement of said rack, a unit receptacle to control the position of said stop, a controlling shaft, means actuated by said controlling shaft to normally hold said rack against movement, a locking device for said stop, and means actuated by said controlling shaft to operate said locking device.

28. The combination with a counting device and weighing mechanism operatively connected with said counting device and adjustable to vary its influence thereon, of an actuating member operatively connected with said weighing mechanism to adjust the same relatively to said counting device, means for operating said actuating member, a stop to limit the movement of said actuating member, a unit receptacle, a supporting member for said stop connected with said unit receptacle, a pair of eccentrically mounted locking members arranged on opposite sides of said supporting member, and means for moving said locking members into operative engagement with said supporting member.

29. The combination with a counting device and weighing mechanism operatively connected with said counting device and adjustable to vary its influence thereon, of an actuating member operatively connected with said weighing mechanism to adjust the same relatively to said counting device, means for operating said actuating member, a unit receptacle, a spring to support said unit receptacle, a cylindrical housing enclosing said spring and connected with said unit receptacle, a stop carried by said housing to control the movement of said actuating member, eccentrically mounted locking members arranged to engage the opposite sides of said housing to lock said stop against movement, and means to actuate said locking members.

30. The combination with a counting device and weighing mechanism operatively connected with said counting device and adjustable to vary its influence thereon, of an actuating member operatively connected with said weighing mechanism to adjust the same relatively to said counting device, means for operating said actuating member, a unit receptacle, a spring to support said unit receptacle, a supporting member connected with said unit receptacle, a stop carried by said supporting member and arranged to control the movement of said actuating member, and two sets of locking devices arranged to simultaneously engage said supporting member to lock said stop against movement, and means for simultaneously actuating said locking devices.

31. The combination with weighing mechanism, and a counting device operatively connected with said weighing mechanism and comprising an indicator, said weighing mechanism being adjustable to vary its influence on said counting device, of weight operated means for automatically controlling the adjustment of said weighing mechanism with relation to said counting device to cause different amounts of movement to be imparted to said indicator by an article of a given weight.

32. The combination with weighing mechanism, and a counting device operatively connected with said weighing mechanism and comprising an indicator, of means for adjusting said weighing mechanism with relation to said counting device to cause different amounts of movement to be imparted to said indicator by an article of given weight, a unit receptacle, and means controlled by said unit receptacle to control the adjustment of said weighing mechanism.

33. The combination with weighing mechanism, and a counting device operatively connected with said weighing mechanism and comprising an indicator, of means for adjusting said weighing mechanism with relation to said counting device to cause different amounts of movement to be imparted to said indicator by an article of given weight, an actuating member, and operative connection between said actuating member and said adjusting means comprising a cam, a unit receptacle, and means controlled by said unit receptacle to control the amount of movement imparted to said cam.

34. The combination with a counting device and weighing mechanism operatively connected with said counting device and adjustable to vary its influence thereon, of weight operated means to automatically control the adjustment of said weighing mechanism.

35. The combination with a counting device, a weighing mechanism operatively connected therewith and comprising a part having an adjustable fulcrum, of normally operable means for adjusting the position of said fulcrum, and a device to control the operation of said adjusting means.

36. The combination with a counting device, weighing mechanism comprising a lever operatively connected with said counting device, and an adjustable fulcrum for said lever, of normally operable means to adjust said fulcrum, and a device for controlling the operation of said adjusting means.

37. The combination with weighing mechanism, and a counting device operatively connected with said weighing mechanism, said weighing mechanism being adjustable to vary its influence on said counting device, of means comprising a cam for adjusting said weighing mechanism relatively to said counting device, and means for actuating said cam.

38. The combination with a counting device, and a weighing mechanism comprising a lever operatively connected with said counting device, of an adjustable fulcrum for said lever, adjusting mechanism for said fulcrum comprising a cam, means for actuating said cam, and means comprising a yieldable member to automatically control said actuating means.

39. The combination with a counting device and weighing mechanism comprising a lever operatively connected with said counting device, of an adjustable fulcrum for said lever, an adjusting member operatively connected with said fulcrum, a cam for imparting movement to said adjusting member, and means for actuating said cam.

40. The combination with a counting device and weighing mechanism comprising a lever operatively connected with said counting device, of an adjustable fulcrum for said lever, an adjusting member operatively connected with said fulcrum, a cam for imparting movement to said adjusting member, and mechanically controlled means for actuating said cam.

41. In a device of the character described, a load weighing mechanism comprising a lever having an adjustable fulcrum, a unit weighing mechanism, means for automatically controlling the position of said fulcrum relative to said lever by the movement imparted to said unit weighing mechanism by the weight of the unit carried by said unit weighing mechanism, and a computing mechanism to register the number of units comprising the load carried by said load weighing mechanism as determined by the position of said fulcrum.

42. In a device of the character described, a load weighing mechanism, means for varying the ratio-of-leverage of said weighing mechanism, a unit weighing mechanism, means for automatically controlling the ratio-of-leverage of said load weighing mechanism by the movement imparted to said unit weighing mechanism by the weight of the unit carried thereby, and a computing mechanism operatively connected to said load weighing mechanism to register the movement thereof as determined by the leverage of said load weighing mechanism and the weight of the load carried thereby.

43. The combination with a load weighing mechanism and a computing mechanism, of a unit weighing mechanism, and means to cause the movement of said unit weighing mechanism as determined by the weight of a unit carried thereby to control the effective power of a load carried by said load weighing mechanism and to cause the movement of said computing mechanism to vary in accordance with the movement of said load weighing mechanism.

44. The combination with weighing mechanism, a computing device operatively connected with said weighing mechanism, and means for adjusting said weighing mechanism to vary its influence on said computing device, of an operable device to control the operation of said adjusting means according to a unit of computation.

In testimony whereof, I affix my signature hereto.

EDWARD B. LOCKE.